US009204191B2

(12) United States Patent
Lee

(10) Patent No.: US 9,204,191 B2
(45) Date of Patent: Dec. 1, 2015

(54) DISPLAY DEVICE AND METHOD OF PROVIDING VOD SERVICE THEREOF

(71) Applicant: LG ELECTRONICS INC., Seoul (KR)

(72) Inventor: Jaekyung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/454,495

(22) Filed: Aug. 7, 2014

(65) Prior Publication Data

US 2015/0082348 A1    Mar. 19, 2015

(30) Foreign Application Priority Data

Sep. 16, 2013    (KR) ........................ 10-2013-0111129

(51) Int. Cl.

| | | |
|---|---|---|
| G06F 3/00 | (2006.01) | |
| G06F 13/00 | (2006.01) | |
| H04N 5/445 | (2011.01) | |
| H04N 21/472 | (2011.01) | |
| H04N 21/231 | (2011.01) | |
| H04N 21/262 | (2011.01) | |
| H04N 21/6375 | (2011.01) | |
| H04N 21/266 | (2011.01) | |
| H04N 21/482 | (2011.01) | |

(52) U.S. Cl.
CPC ... *H04N 21/47214* (2013.01); *H04N 21/23109* (2013.01); *H04N 21/266* (2013.01); *H04N 21/2625* (2013.01); *H04N 21/26275* (2013.01); *H04N 21/26283* (2013.01); *H04N 21/47202* (2013.01); *H04N 21/482* (2013.01); *H04N 21/6375* (2013.01)

(58) Field of Classification Search
USPC ....................................... 725/37–40
See application file for complete search history.

(56) References Cited

U.S. PATENT DOCUMENTS

| | | | |
|---|---|---|---|
| 7,992,179 B1* | 8/2011 | Kapner et al. ................... | 725/95 |
| 8,271,334 B1* | 9/2012 | Funk et al. ................... | 705/14.73 |
| 2010/0175086 A1 | 7/2010 | Gaydou et al. ................... | 725/39 |
| 2012/0054810 A1 | 3/2012 | Nijim ................................ | 725/93 |

FOREIGN PATENT DOCUMENTS

| | | |
|---|---|---|
| WO | WO 02/45430 A2 | 6/2002 |
| WO | WO 2004/073306 A2 | 8/2004 |

OTHER PUBLICATIONS

European Search Report issued in Application No. 14002421.7 dated Oct. 2, 2014.

* cited by examiner

*Primary Examiner* — Yassin Alata
(74) *Attorney, Agent, or Firm* — Ked & Associates, LLP

(57) ABSTRACT

A display device includes a memory, a display module, a network interface configured to access a Video On Demand (VOD) server, and a controller configured to register a program for a rerun notification service, display a VOD program guide by receiving an additional information on a plurality of VOD program from a VOD server via the network interface, detect whether the additional information on the registered program exists in the VOD program guide, and output a message indicating that the program is uploaded in the VOD program guide via the rerun notification service if the additional information on the registered program exists in the VOD program guide.

18 Claims, 15 Drawing Sheets

FIG. 6
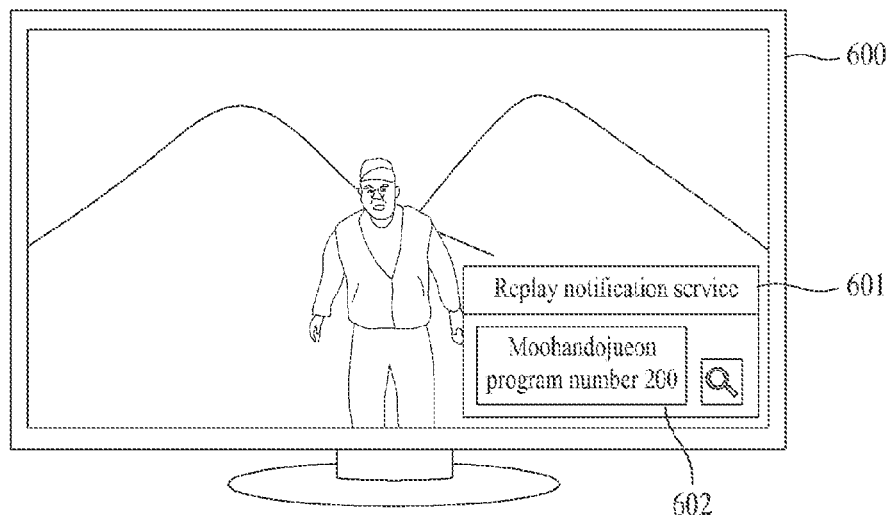
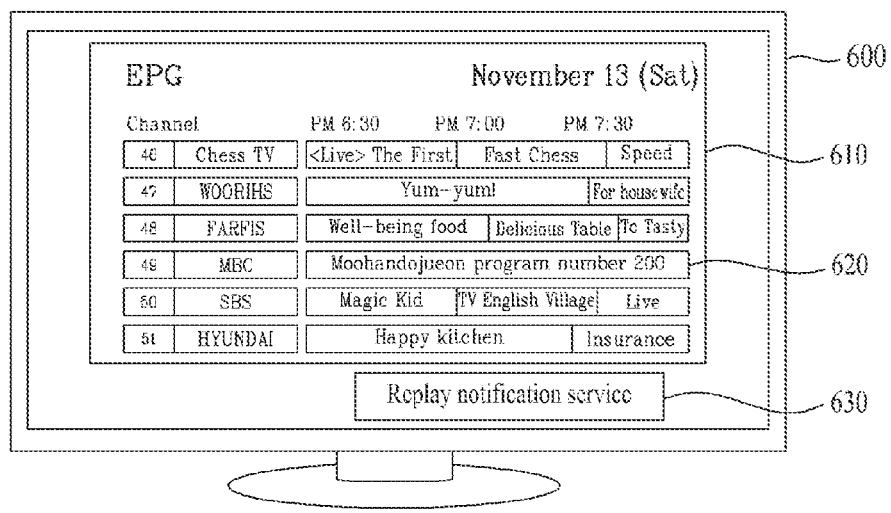
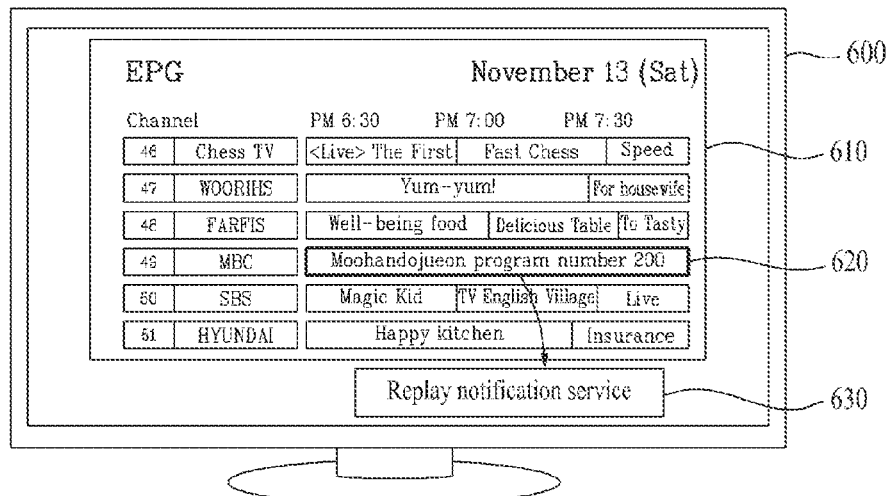

FIG. 7
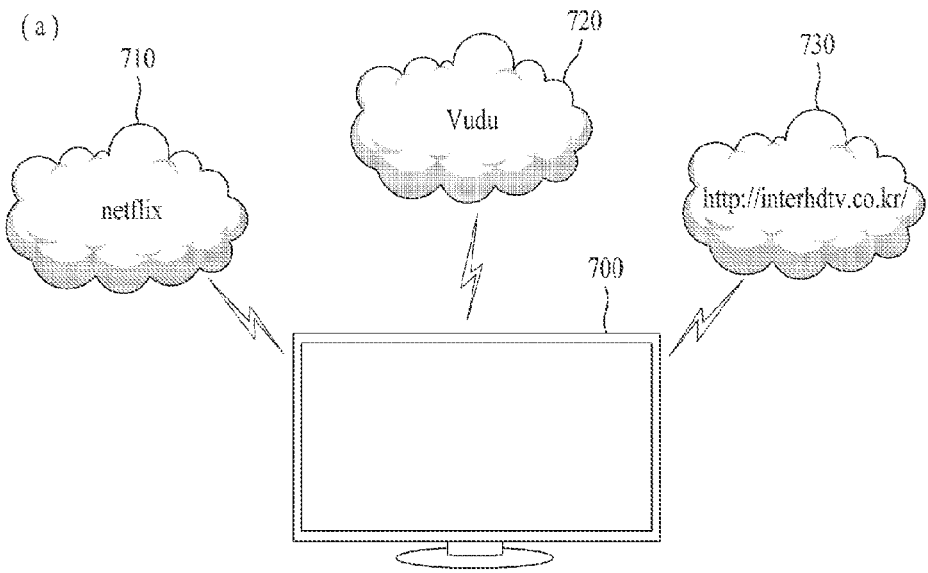
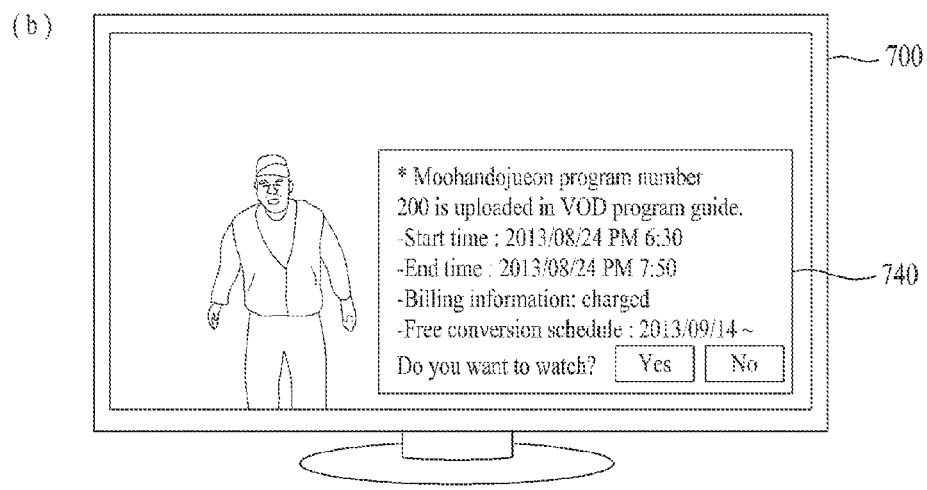
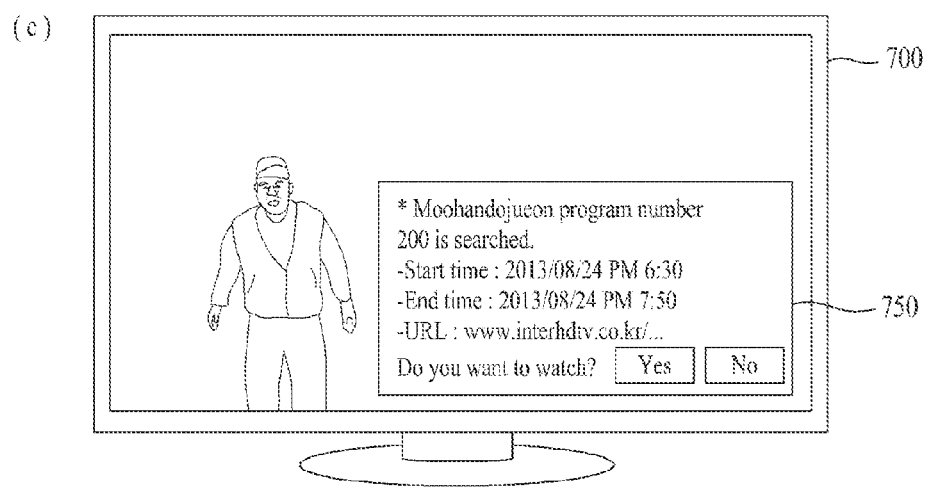

FIG. 8

| | Data Base | |
|---|---|---|
| | | — 800 |
| 1 | www.interhdtv.kr | — 810 |
| 2 | www.dailymotion.com/kr | — 820 |
| 3 | www.playy.co.kr | — 830 |
| . . . | . . . | |

FIG. 10
(a)
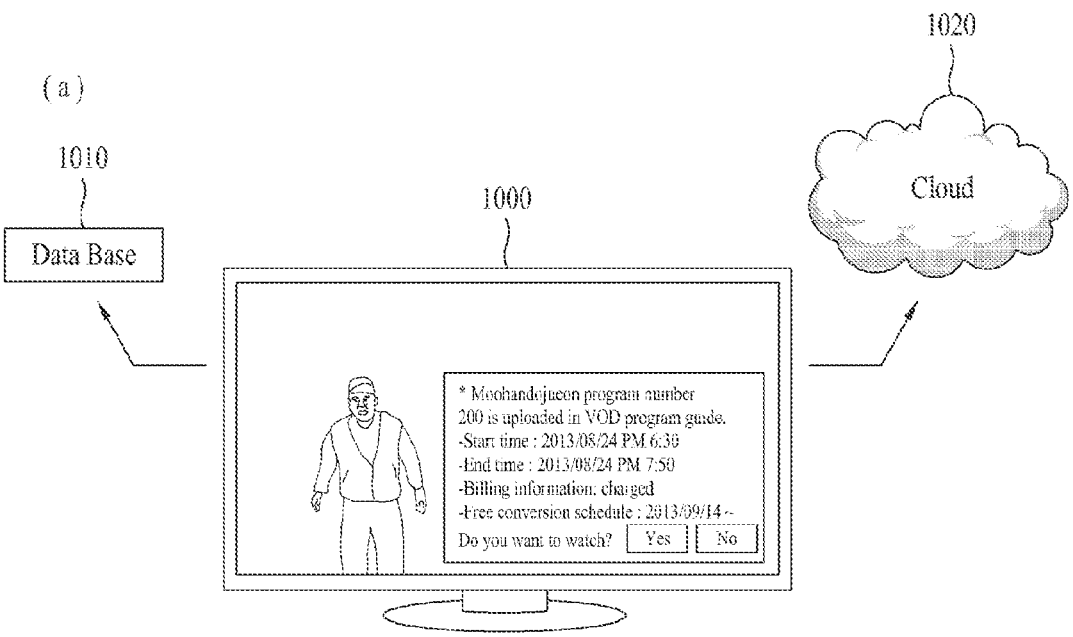
(b)
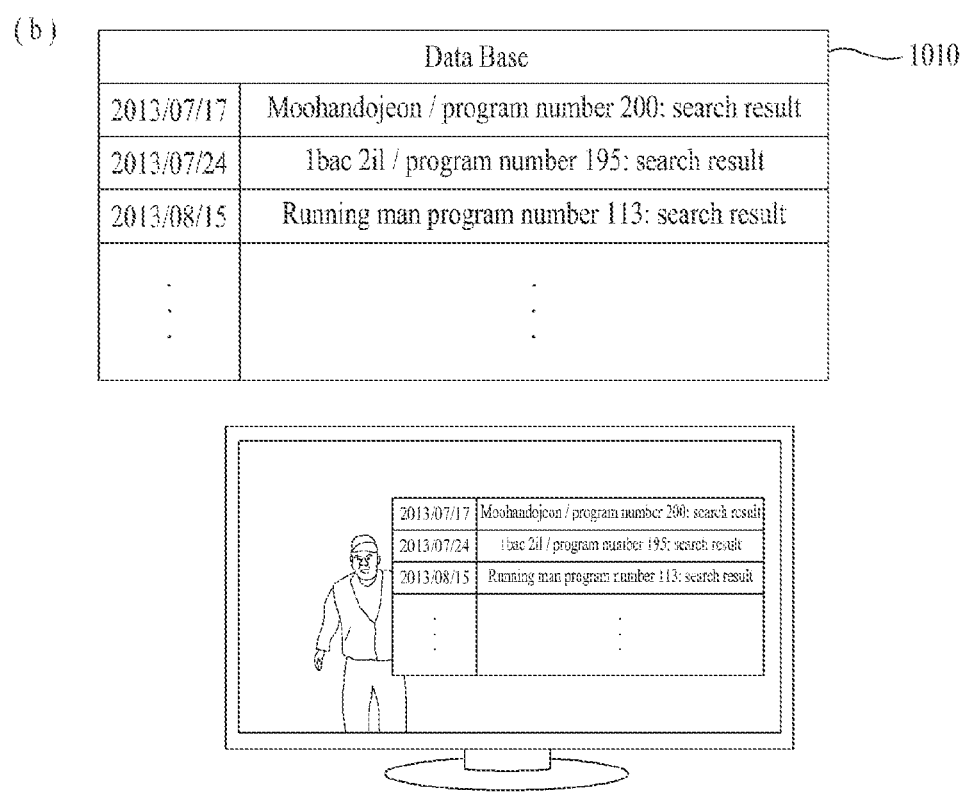

FIG. 11
(a) 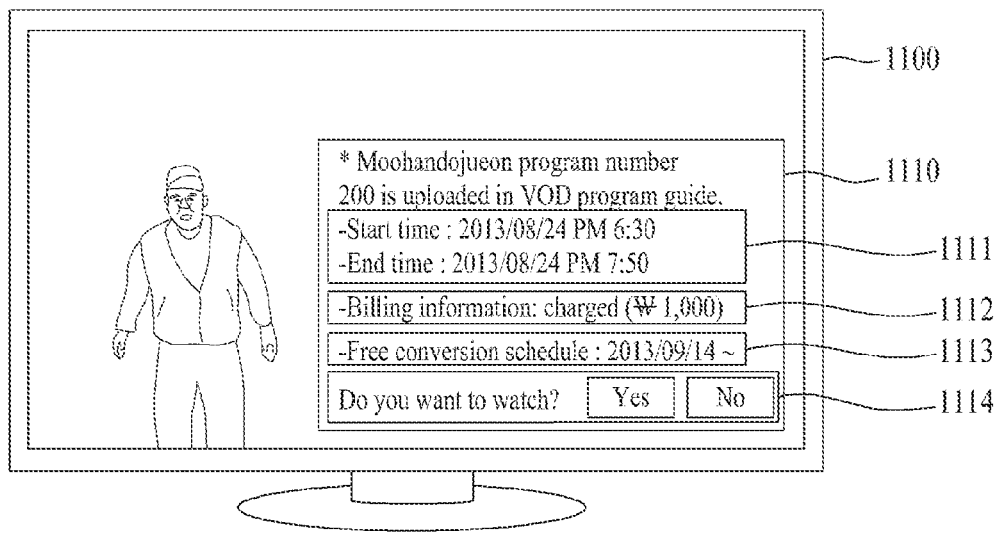
(b) 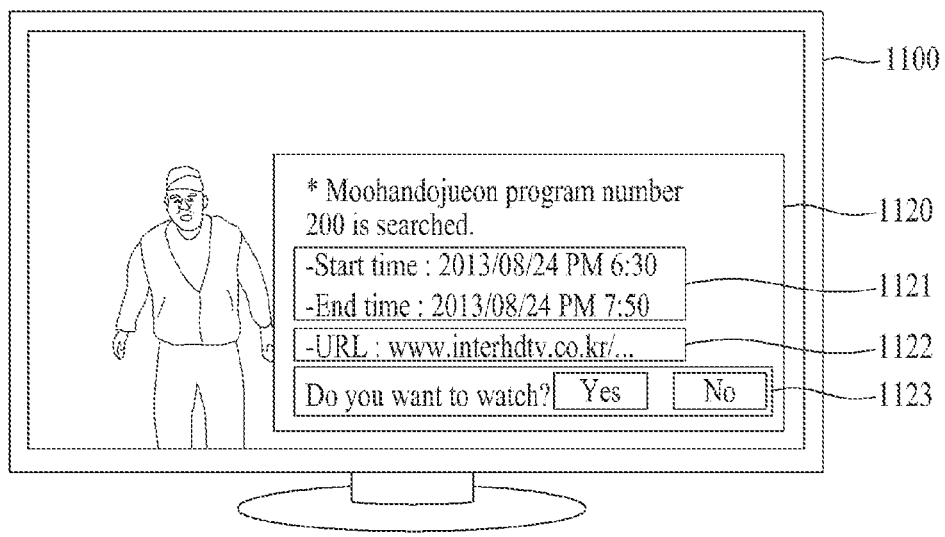

DISPLAY DEVICE AND METHOD OF PROVIDING VOD SERVICE THEREOF

This application claims the benefit of the Korean Patent Application No. 10-2013-0111129, filed on Sep. 16, 2013, which is hereby incorporated by reference as if fully set forth herein.

BACKGROUND

1. Field

The present disclosure relates to a technology applicable to various display devices. More particularly, when a program for a rerun notification service is registered and a rerun service for the registered program is available after a data is received from a VOD server, the present disclosure relates to a display device enabling a user to conveniently receive the rerun service and a method of providing the rerun service in the display device in a manner that the registered program provides the rerun notification service to the user to indicate the currently available rerun service.

2. Background

An EPG output from a display device includes information on various programs. Currently, a program rerun service is provided by an IPTV and the like. And, if a user selects a reserved watch for a program in the EPG, the selected program is automatically output on a start time of the selected program. If the user selects a reserved recording for a program, the selected program is automatically recorded on a start time of the selected program. For instance, the display device corresponds to a cellular phone, a smartphone, a computer, a tablet PC, a notebook, a netbook, a TV (television), other broadcast receiving device, and the like.

The above references are incorporated by reference herein where appropriate for appropriate teachings of additional or alternative details, features and/or technical background.

SUMMARY OF THE DISCLOSURE

Accordingly, the present disclosure is directed to an apparatus and method thereof that substantially obviate one or more problems due to limitations and disadvantages of the related art.

An object of one embodiment of the present disclosure is to enable a user to promptly and conveniently receive a rerun notification service in a manner of checking whether a program, which is registered by a user for the rerun notification service, is uploaded in a VOD program guide with a predetermined period.

Another object of a different embodiment of the present disclosure is to enhance user convenience in a manner of automatically searching for a program registered by a user by accessing a predetermined VOD server in a display device.

The other object of a further different embodiment of the present disclosure is to specifically define a problem-solving plan or a solution to enhance memory efficiency of a display device in a manner of providing a rerun notification service for a program registered by a user in a web browser via a VOD server.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, according to one embodiment, a display device includes a memory, a display module, a network interface configured to access a VOD server, and a controller configured to control the display device, the controller configured to register a program for a rerun notification service, the controller configured to generate a VOD program guide by receiving an additional information on a newly uploaded VOD program from a VOD server via a network interface, the controller configured to detect whether the additional information on the registered program exists in the VOD program guide, if the additional information on the registered program exists in the VOD program guide, the controller configured to output a message, which indicates that the program is uploaded in the VOD program guide, via the rerun notification service, wherein the rerun notification service is to give a notification to provide a rerun service for a program broadcasted in real time in the past.

To further achieve these and other advantages and in accordance with the purpose of the present disclosure, according to one embodiment, a method of providing a VOD service in a display device includes the steps of registering a program for a rerun notification service, generating a VOD program guide by receiving an additional information on a newly uploaded VOD program from a VOD server via a network interface, detecting whether the additional information on the registered program exists in the VOD program guide, and if the additional information on the registered program exists in the VOD program guide, outputting a message, which indicates that the program is uploaded in the VOD program guide, via the rerun notification service, wherein the rerun notification service is to give a notification to provide a rerun service for a program broadcasted in real time in the past.

According to one embodiment of the present disclosure, a user can promptly and conveniently receive a rerun notification service in a manner of checking whether a program, which is registered by the user for the rerun notification service, is uploaded in a VOD program guide with a predetermined period.

According to a different embodiment of the present disclosure, it is able to enhance user convenience in a manner of automatically searching for a program registered by a user by accessing a predetermined VOD server in a display device.

According to a further different embodiment of the present disclosure, it is able to specifically define a problem-solving plan or a solution to enhance memory efficiency of a display device in a manner of providing a rerun notification service for a program registered by a user in a web browser via a VOD server.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a diagram for an example of registering a program for a rerun notification service in a display device according to one embodiment of the present disclosure;

FIG. 7 is a diagram for an example that a display device according to one embodiment of the present disclosure judges whether a specific program is uploaded in a VOD program guide in a manner of accessing a VOD server;

FIG. 8 is a diagram for a data base included in a memory of a display device according to one embodiment of the present disclosure;

FIG. 10 is a diagram for an example that a display device according to one embodiment of the present disclosure stores a search result in a cloud server;

FIG. 11 is a diagram for an example that a display device according to one embodiment of the present disclosure outputs a rerun notification service;

DETAILED DESCRIPTION

In the following description, the present disclosure is explained in detail with reference to drawings.

A suffix 'module' and 'unit' for a composing element in the following description is simply used for clarity of writing the present specification. Thus, the 'module' and the 'unit' can be used in a manner of being mixed.

For instance, a display device described in the present disclosure can perform user-friendly various functions since various applications can be freely added or deleted on a general-purpose OS kernel. As a more specific example, the display device described in the present disclosure can be implemented by a smartphone, a tablet PC, a TV, and the like.

And, a rerun notification service performed by a display device described in the present disclosure is an example of services provided by the display device. The attribute of the present disclosure can be applied to a different service as well. The present disclosure may be non-limited to the rerun notification service.

Moreover, while the embodiments of the present disclosure have been concretely described with reference to the attached diagrams and the contents written on the diagrams, the present disclosure may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Figure 1:
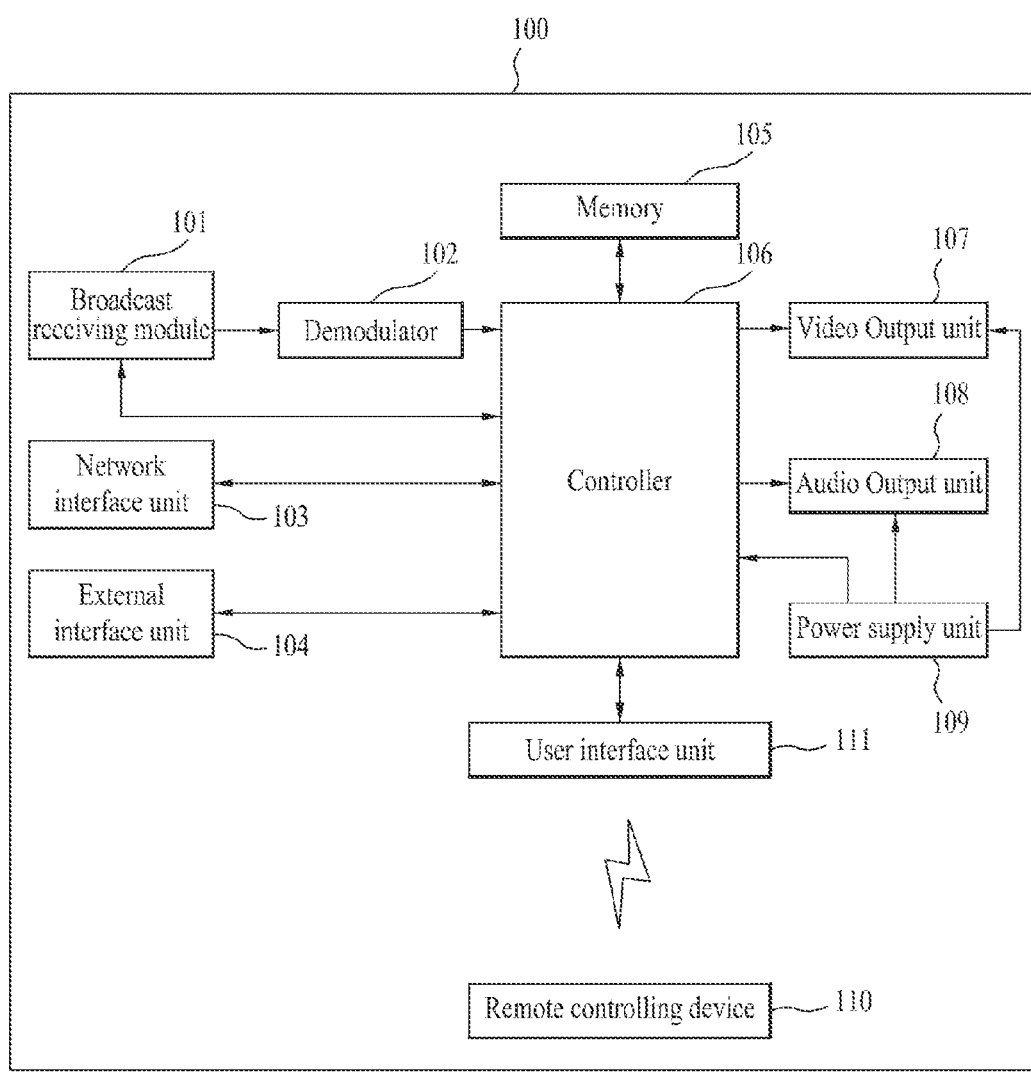
FIG. 1 is a detail block diagram for components of a display device according to one embodiment of the present disclosure.

FIG. 1 is a detail block diagram for components of a display device according to one embodiment of the present disclosure. As depicted in FIG. 1, a display device 100 according to one embodiment of the present disclosure consists of a broadcast reception module 101, a demodulation unit 102, a network interface unit 103, an external device interface unit 104, a memory 105, a control unit 106, a video output unit 107, an audio output unit 108, a power supply unit 109, a remote controller device 110, a user interface unit 111, and the like. Meanwhile, the display device 100 is designed to perform a data communication with a remote controller corresponding to the remote controller device 110. The remote controller device is explained as the remote controller in the following description. The remote controller shall be described in detail with reference to FIG. 3 and FIG. 4.

For instance, the broadcast reception module 101 can be designed by an RF tuner or an interface receiving a broadcast data from such an external device as an STB and the like. For instance, the broadcast reception module 101 can receive an RF broadcast signal of a single carrier according to an ATSC (advanced television system committee) scheme or an RF broadcast signal of a plurality of carriers according to a DVB (digital video broadcasting) scheme.

The demodulation unit 102 performs a demodulation operation in a manner of receiving a digital IF signal (DIF) converted by the broadcast reception module 101. For instance, if the digital IF signal output from the broadcast reception module 101 corresponds to the ATSC scheme, the demodulation unit 102 performs 8-VSB (8-vestigal side band) demodulation. And, the demodulation unit 102 may perform a channel decoding.

The external device interface unit 104 is an interface enabling a data communication to be performed between an external device and a digital display device 100. The external device interface unit 104 can be connected with such an external device as a DVD (digital versatile disk), a Blue-ray, a gaming device, a camera, a camcorder, a computer (notebook), an STB, and the like in wired or wireless. The external device interface unit 104 delivers a video, an audio, or a data signal inputted from an external to the control unit 106 via the connected external device. And, the external device interface unit 104 can output the video, the audio, or the data signal processed in the control unit 106 to the external device. For instance, the external device interface unit 104 may include a USB terminal, a CVBS (composite video banking sync) terminal, a component terminal, an S-video terminal (analog), a DVI (digital visual interface) terminal, an HDMI (high definition multimedia interface) terminal, an RGB terminal, a D-SUB terminal, and the like.

The network interface unit 103 provides an interface to connect the display device 100 to a wired/wireless network including the internet network. For instance, the network interface unit 103 can be equipped with an Ethernet terminal and the like to access a wired network and may use such a communication standard as WLAN (wireless LAN)(WiFi), Wibro (wireless broadband), Wimax (world interoperability for microwave access), HSDPA (high speed downlink packet access) and the like to access a wireless network. The network interface unit 103 can transceive data with a different user or a different electronic device via an accessed network or a different network linked to the accessed network.

The memory 105 may store a program configured to process and control each signal in the control unit 106 and may store a signal-processed video, an audio, or a data signal. And, the memory 105 may perform a function of temporarily storing a video, an audio, or a data signal inputted from the external device interface unit 104 or the network interface unit 103. Moreover, the memory 105 stores various OS, a middleware, and a platform.

The user interface unit 111 delivers a signal inputted by a user to the control unit 106 or transmits a signal transmitted from the control unit 106 to an external device (e.g., the remote controller 110). For instance, the user interface unit 111 is designed to receive such a control signal as power on/off, channel selection, screen setting and the like from the remote controller 110 according to such various communication schemes as an RF (radio frequency) communication scheme, an infrared-ray (IR) communication scheme and the like and process them. Or, the user interface unit is designed to transmit a control signal transmitted from the control unit 106 to the remote controller 110.

The control unit 106 demultiplexes an inputted stream via the broadcast reception module 101, the demodulation unit 102, the network interface unit 103, or the external device interface unit 104, processes demultiplexed signals, and may be then able to generate and output a signal used to output a video or an audio. The control unit 106 shall be explained in more detail with reference to FIG. 2.

The video output unit 107 generates an actuation signal in a manner of converting a video signal, a data signal, an OSD signal processed in the control unit 106 or a video signal, a data signal and the like received by the external device interface unit 104 to R, G, and B signal, respectively. The video output unit 107 may correspond to a PDP, a LCD, an OLED, a flexible display, a 3D display and the like.

The audio output unit 108 receives a signal audio-processed in the control unit 106, e.g., a stereo signal, a 3.1 channel signal, or a 5.1 channel signal, and outputs the signal as an audio. The audio output unit 108 can be implemented by a speaker of various forms.

The power supply unit 109 supplies power for the overall display device 100. In particular, the power supply unit can supply power to the control unit 106 implementable by a form of system on chip (SOC), the video output unit 107 configured to display a video, and the audio output unit 108 configured to output an audio.

Figure 2:
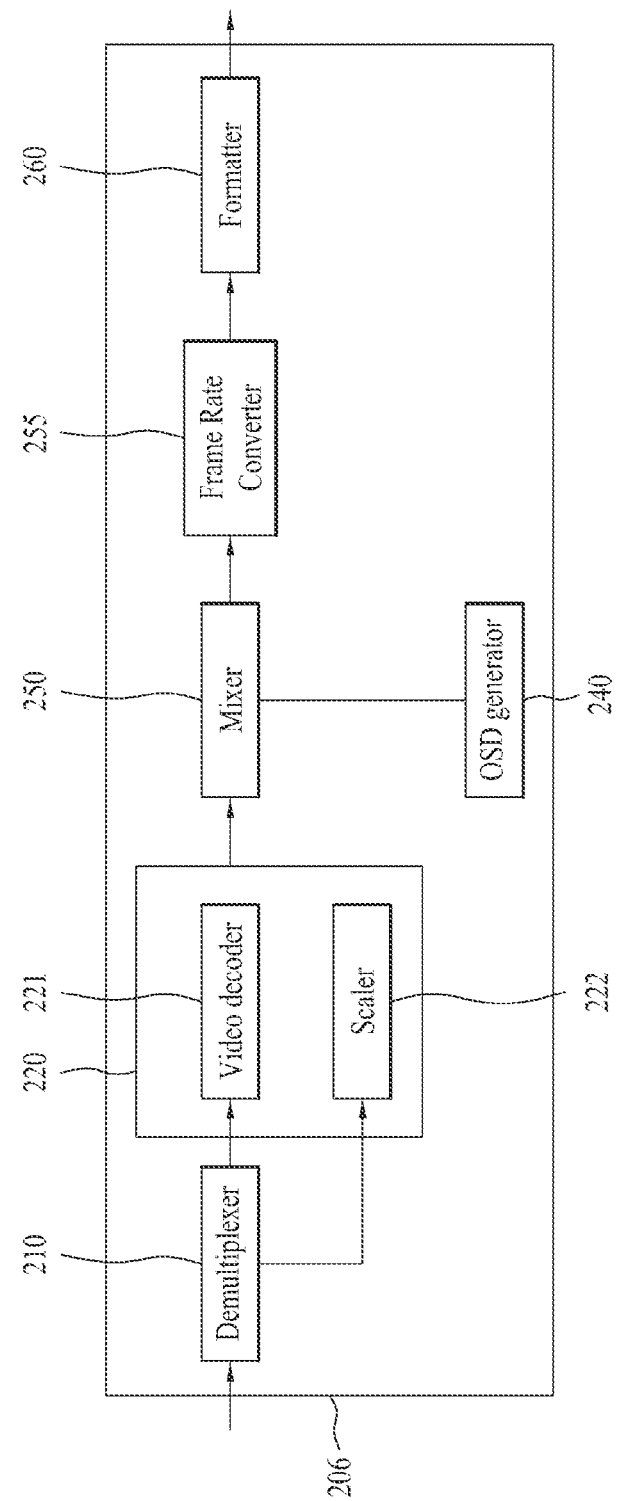
FIG. 2 is a more detail block diagram for a control unit depicted in FIG. 1.

FIG. 2 is a more detail block diagram for a control unit depicted in FIG. 1. As depicted in FIG. 2, the control unit 206 of the display device includes a demultiplexing unit 210, a video processing unit 220, an OSD generating unit 240, a mixer 250, a frame rate converter 255, a formatter 260, and the like. And, the control unit 206 can be designed to further include an audio processing unit (not depicted) and a data processing unit (not depicted).

The demultiplexing unit 210 demultiplexes an inputted stream. For instance, if MPEG-2 TS is inputted, the demultiplexing unit demultiplexes the MPEG-2 TS and may be then able to divide the MPEG-2 TS into a video, an audio, and a data signal, respectively.

The video processing unit 220 can perform a video processing for a demultiplexed video signal. To this end, the video processing unit 220 can be equipped with a video decoder 221 and a scaler 222. The video decoder 221 decodes the demultiplexed video signal and the scaler 222 performs scaling to enable the video output unit to output resolution of the decoded video signal. The video signal decoded in the video processing unit 220 is inputted to the mixer 250.

The OSD generating unit 240 generates an OSD signal according to a user input or by itself. Hence, the mixer 250 can mix the OSD signal generated by the OSD generating unit 240 and the decoded video signal, which is video-processed in the video processing unit 220. The mixed signal is provided to the formatter 260. When the decoded broadcast video signal or an external input signal is mixed with the OSD signal, an OSD can be displayed on a broadcast video or an external input video in a manner of being overlaid.

The frame rate converter (FRC) 255 can convert a frame rate of an inputted video. For instance, the frame rate converter 255 converts a frame rate of 60 Hz to a frame rate of 120 Hz or 240 Hz.

And, the formatter 260 receives an output signal of the frame rate converter 255 and outputs the signal in a manner of modifying a format of the signal to make the signal suitable for the video output unit. For instance, the formatter can output R, G, and B data signal. The R, G, and B data signal can be output as a low voltage differential signaling (LVDS) or a mini-LVDS.

Figure 3:
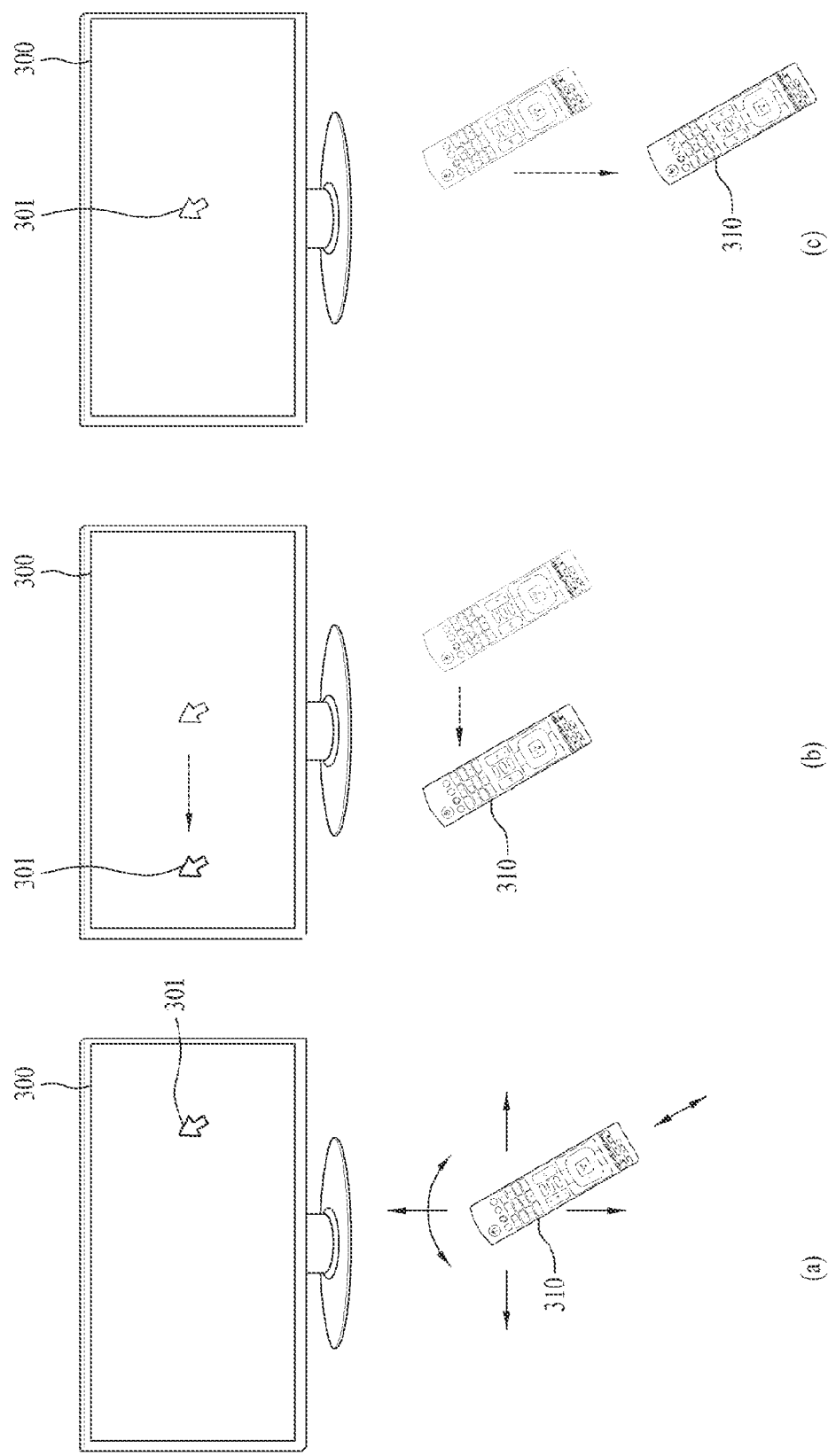
FIG. 3 is a diagram for an exterior of a remote controller according to one embodiment of the present disclosure.

FIG. 3 is a diagram for an exterior of a remote controller according to one embodiment of the present disclosure. As depicted in FIG. 3 (*a*), a pointer 301, which corresponds to a movement of a remote controller 310, is displayed on a screen of a display device 300. A user can move the remote controller 310 left and right (FIG. 3 (*b*)) and top and bottom (FIG. 3 (*c*)) or rotate the remote controller. Since the pointer 301 is displayed on the screen according to the movement of the remote controller in a 3D space, the remote controller 310 may be named as a space remote controller. As depicted in FIG. 3 (*b*), when a user moves the remote controller 310 to the left, the pointer 301 displayed on the screen of the display device 300 moves to the left as well. Meanwhile, information on the movement of the remote controller 310 detected by a sensor of the remote controller 310 is transmitted to the display device 300. The digital display device 300 can calculate a coordinate of the pointer 301 from the information on the movement of the remote controller 310. The display device 300 is designed to display the pointer 301 corresponding to the calculated coordination. Meanwhile, as depicted in FIG. 3 (*c*), when a user moves the remote controller 310 to the bottom, the pointer 301 displayed on the screen of the display device 300 moves to the bottom as well. Hence, a specific area within the screen of the display device 300 can be promptly selected by a user using the remote controller 310 according to one embodiment of the present disclosure.

Figure 4:
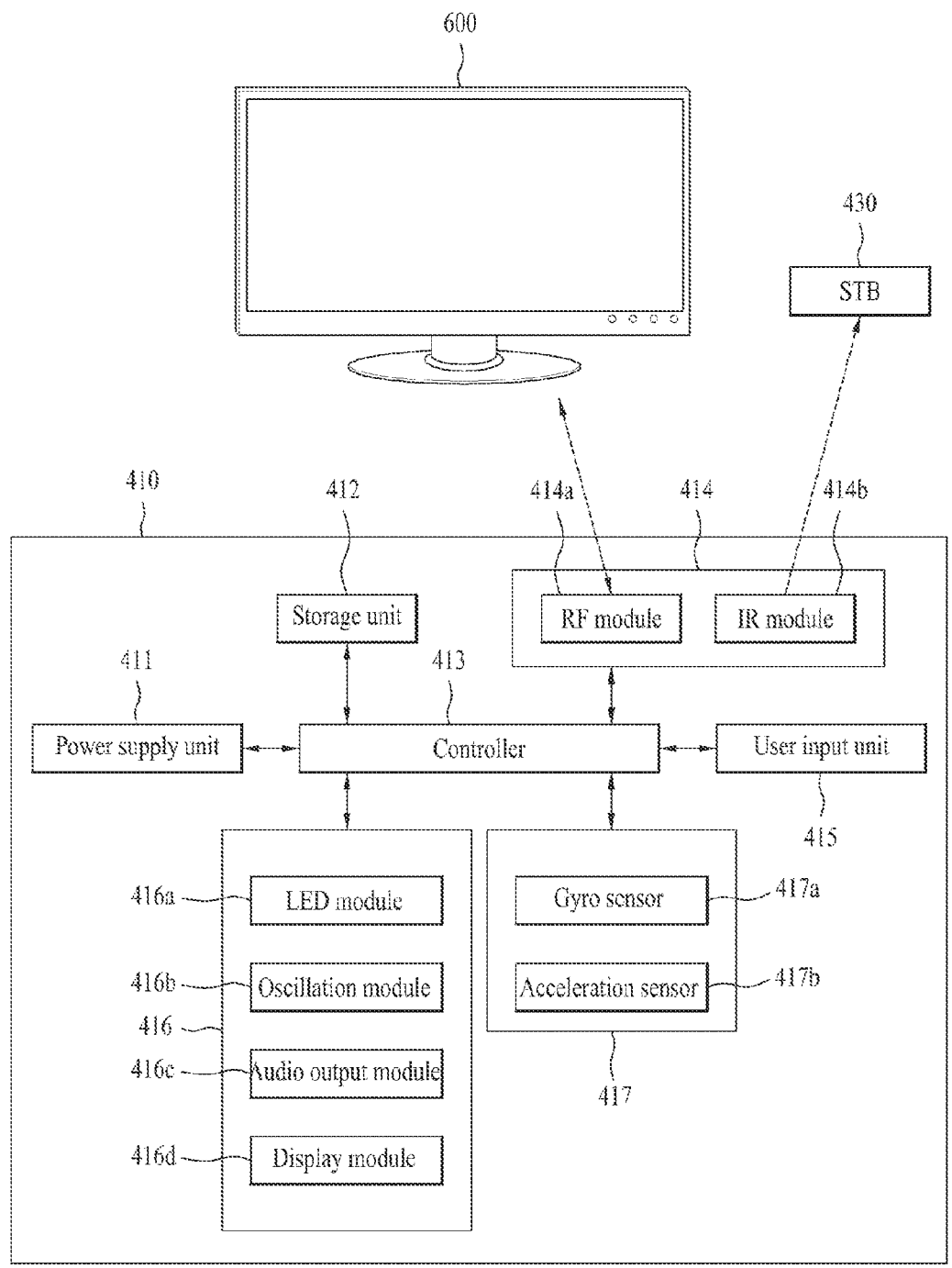
FIG. 4 is a detail block diagram for components of a remote controller depicted in FIG. 3.

FIG. 4 is a detail block diagram for components of a remote controller depicted in FIG. 3. As depicted in FIG. 4, a remote controller 410 includes a radio communication unit 414, a user input unit 415, a sensor unit 417, an output unit 416, a power supply unit 411, a storing unit 412, a control unit 413, and the like.

The radio communication unit 414 is designed to enable a communication to be performed with a random external device. In particular, according to one embodiment of the present disclosure, an RF module 414a is designed to perform a data communication with the display device 400 and an IR module 414b is designed to perform an infrared-ray communication with an external electronic device 430 (e.g., STB). Hence, it is possible to make the remote controller 410 play a role of a relay, which forwards an IR infrared code value received from the display device 400 to the STB 430. Moreover, according to one embodiment of the present disclosure, the remote controller 410 transmits a signal including information on the movement of the remote controller 410 and the like to the display device 400 via the RF module 414a. And, the remote controller 410 can receive a signal transmitted by the display device 400 via the RF module 414a. The remote controller 410 can transmit a command on power on/off, channel change, volume adjustment and the like to the display device 400 via the IR module 414b if necessary.

The user input unit 415 consists of a key pad, a button, a touch pad, a touch screen, or the like.

The sensor unit 417 can be equipped with a gyro sensor 417a or an acceleration sensor 417b. The gyro sensor 417a can sense information on a movement of the remote controller 410. As an example, the gyro sensor 417a can sense the information on the movement of the remote controller 410 on the basis of x, y, and z axis. The acceleration sensor 417b can sense information on a moving speed of the remote controller 410 and the like. Meanwhile, the sensor unit 417 may be further equipped with a distance measuring sensor. The distance measuring sensor can sense a distance between the display device 400 and the remote controller.

The output unit 416 can output a video or an audio signal corresponding to an operation of the user input unit 415 or a signal transmitted by the display device 400. As an example, the output unit 416 can be equipped with a LED module, which is lighted when the user input unit 415 is operated or a signal is transceived with the display device via the radio communication unit 414, a vibration module 416b generating a vibration, a sound output module 416c outputting a sound, or a display module 416d outputting a video.

The power supply unit 411 supplies power to each component of the remote controller 410. If the remote controller 410 does not move for a prescribed time, the power supply unit 411 stops supplying the power to the remote controller, thereby reducing power waste.

The storing unit 412 can store a program, an application data, and the like of various types necessary to control or operate the remote controller 410. And, the control unit 413 controls various matters related to a control of the remote controller 410. For instance, the control unit 413 can transmit a signal corresponding to a prescribed key operation of the user input unit 415 or a signal corresponding to a movement of the remote controller 410 sensed by the sensor unit 417 to the display device 400 or the STB via the radio communication unit 414.

Meanwhile, the display device depicted in FIG. 4 can be called a multimedia device and may include all components of the remote controller 410 depicted in FIG. 4, by which the scope of right of the present disclosure may be non-limited. And, a user can select an icon displayed via the display module according to the present disclosure using the remote controller 410 or may select the icon by touching it without using the remote controller 410.

Figure 5:
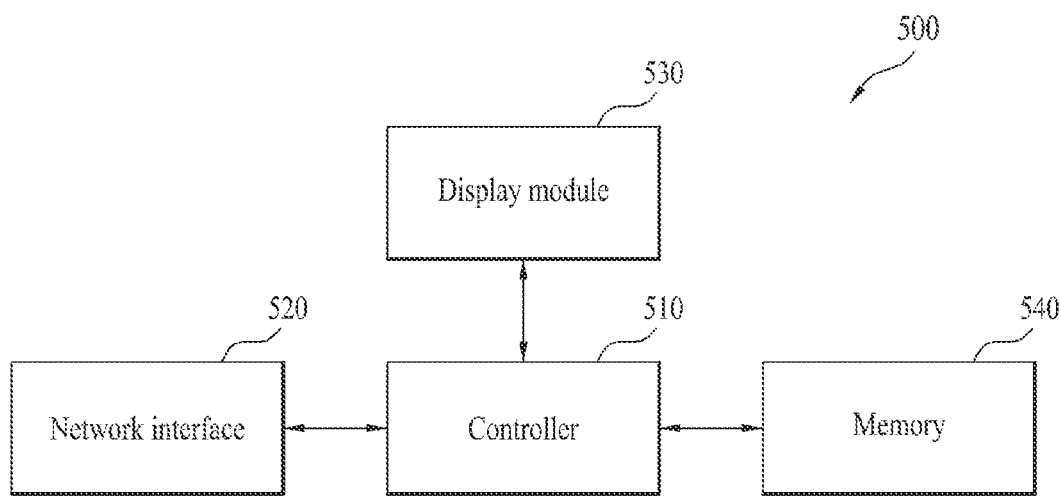
FIG. 5 is a detail block diagram for a configuration module of a display device according to a different embodiment of the present disclosure.

FIG. 5 is a detail block diagram for a configuration module of a display device according to a different embodiment of the present disclosure. A part of modules of the display device depicted in FIG. 5 can be added or deleted with reference to the aforementioned FIG. 1 to FIG. 4. Basically, the scope of right of the present disclosure should be comprehended according to the items written on the claims instead of being determined by the elements written on FIG. 1 to FIG. 5. As depicted in FIG. 5, the display device 500 includes a controller 510, a network interface 520, a display module 530, a memory 540, and the like. Yet, a part of the modules can be added or deleted according to the necessity of those skilled in the art. Basically, the scope of right of the present disclosure should be determined according to the items written on the claims.

The network interface 520 can receive additional information on a VOD program in a manner of accessing a predetermined VOD server. As an embodiment, the network interface 520 may correspond to the network interface unit 103 explained earlier in FIG. 1.

The display module 530 is designed to output an input window, an EPG, a program, a web browser, and the like in a screen of the display device 500 according to one embodiment of the present disclosure to register a program for a rerun notification service. The display module 530 corresponds to a display unit, a display module, a screen output device, and the like installed in a cellular phone, a smartphone, a computer, a tablet PC, a notebook, a netbook, a TV, other broadcast reception device, and the like. As an embodiment, the display module 530 may correspond to a video output unit 107 explained earlier in FIG. 1.

The memory 540 stores information on a predetermined VOD server, which is accessed by the controller 510 of the display device according to one embodiment of the present disclosure with a predetermined period to provide a rerun notification service and a VOD program guide information to a user, an additional information on a VOD program which is received by accessing the predetermined VOD server, a VOD program guide information, a result of searching for a program registered by a user, and the like in a data base. As an embodiment, the memory 540 may correspond to the memory 105 explained earlier in FIG. 1.

The controller 510 performs a function of generally managing a function of at least one modules depicted in FIG. 5 including the network interface 520, the display module 530, the memory 540, and the like. Regarding this, it shall be described in more detail with reference to FIG. 6 to FIG. 14.

FIG. 6 is a diagram for an example of registering a program for a rerun notification service in a display device according to one embodiment of the present disclosure. As depicted in FIG. 6 (a), the controller of the display device 600 according to one embodiment of the present disclosure is configured to register a program for a rerun notification service, display a VOD program guide by receiving an additional information on a plurality of VOD program from a VOD server via the network interface, detect whether the additional information on the registered program exists in the VOD program guide, and output a message indicating that the program is uploaded in the VOD program guide via the rerun notification service if the additional information on the registered program exists in the VOD program guide.

If the additional information on the registered program exists in the VOD program guide, the controller can control a message, which indicates that the program is uploaded in the VOD program guide, to be output via the rerun notification service. The controller can control the interface 601, which is used to register the program for the rerun notification service from a user, to be output in a screen. The interface 601 may include a keyword input window 602. A user can register a program intending to receive a rerun notification service via the keyword input window 602. The rerun notification service has a characteristic of giving a notification to provide a rerun service for a previously broadcast program to a user.

If the program for the rerun notification service is registered, the controller of the display device 600 according to one embodiment of the present disclosure can also be registered by information on a program number in case that the registered program corresponds to series. Hence, if the information on the program number is registered together with the program, the controller of the display device 600 according to one embodiment of the present disclosure judges whether a program matched with title information of the program, channel information, and the information on the program number is uploaded in the VOD program guide.

And, if a plurality of programs matched with the additional information on the registered program exist in the VOD program guide, the controller can output information on a matched program in the rerun notification service. And, if there exist a plurality of programs matched with the additional information on the registered program in the VOD program guide, the controller of the display device 600 according to one embodiment of the present disclosure can control to only output a program, which has not been watched before, by the rerun notification service in a manner of enabling selection of the program.

And, if there exist a plurality of programs matched with the additional information on the registered program in the VOD program guide, the controller of the display device 600 according to one embodiment of the present disclosure can control viewing history information on the matched program to be output together. In particular, the controller of the display device 600 according to one embodiment of the present disclosure can configure the program having a record of past viewing history not to be output in the rerun notification service according to an output configuration of the rerun notification service.

As depicted in FIG. 6 (b), the display device 600 according to one embodiment of the present disclosure can output an EPG (electronic program guide) 610 in a first region of a screen. The EPG 610 can include information on various programs. And, the display device 600 can output a rerun notification service icon 630 in a second region of the screen. The display device 600 according to one embodiment of the present disclosure can register a program for a rerun notification service from the EPG 610.

For instance, as depicted in FIG. 6 (c), if a user registers a specific program 620, the registered specific program 620 part is highlighted. And, if the display device 600 receives a signal configured to move a cell corresponding to the highlighted part to the rerun notification service icon in a manner that a user points or drags the cell using a remote controller, the controller of the display device 600 detects additional information on the specific program 620 and searches for the specific program 620 using the additional information on the specific program 620 in a manner of accessing a predetermined VOD server at predetermined time periods. If the specific program 620 is searched in the predetermined VOD server, the controller outputs a rerun notification service in the screen to make a request for an output of the specific program 620.

If a signal making a request for a playback of the program is received via the output rerun notification service, the controller can control the program to be played in a manner of accessing the program in the VOD server via the network interface. The additional information is detected from an EIT (event information table), an ETT (extended text table), and the like included in a broadcast transport stream and the predetermined time period is configured by 10 minutes by default on each VOD server. The predetermined time period can be modified by a user. Explanation on the predetermined VOD server and the rerun notification service shall be described with reference to the following drawing.

FIG. 7 is a diagram for an example that a display device according to one embodiment of the present disclosure judges whether a specific program is uploaded in a VOD program guide in a manner of accessing a VOD server. As depicted in FIG. 7 (a), if a program for a rerun notification service is registered, the controller of the display device 700 according to one embodiment of the present disclosure detects additional information on the registered program and generates a VOD program guide in a manner of receiving additional information on a newly uploaded VOD program from VOD servers 710/720/730.

The controller can judge whether the program registered for the rerun notification service exists in the VOD program guide using the generated VOD program guide. In this case, if the additional information on the program newly uploaded from the VOD server is received via the network interface, the controller can control the additional information to be received at predetermined time periods, to be received when the VOD program is called, or to be received when the display device is turned on or turned off. The rerun notification service can be provided as a popup window on a screen of the display device when the program is uploaded in the VOD program guide.

As depicted in FIG. 7 (b), the controller detects whether the additional information on the registered program exists in the VOD program guide. If the additional information on the registered program exists in the VOD program guide, the controller can control a message, which indicates that the program is uploaded in the VOD program guide, to be output via the rerun notification service. The controller controls a program or other contents to be output in a first region of the display device 700 and can control the rerun notification service 740 to be output in a second region of the display device 700 included in the first region.

As depicted in FIG. 7 (c), the controller searches for a program registered by a user for the rerun notification service with a predetermined period in a manner of accessing a predetermined VOD server. If the program is searched, the controller can control the rerun notification service 750, which indicates that the program is searched, to be output in the screen. The rerun notification service 740/750 shall be described in detail in FIG. 11.

According to a conventional way, in order for a user to reserve a broadcast channel, the user sets a reserved watch (e.g., reminder service) or a reserved recording (e.g., scheduled recording) via a broadcasting guide of the display device and the display device to which the reserved watch or the reserved recording is set performs the function based on channel information, time information, and program information provided by the broadcasting guide. For instance, in case of the reserved watch, the display device automatically selects a channel broadcasting a target program of the reserved watch on a time of broadcasting the target program of the reserved watch and outputs the target program of the reserved watch in a screen to make a user watch the target program of the reserved watch. And, in case of the reserved recording, the display device automatically selects a channel broadcasting a target program of the reserved recording on a time of broadcasting the target program of the reserved recording, automatically records the target program of the reserved recording, and stores the recorded data in a memory to make a user watch the target program of the reserved recording in a manner of accessing the recorded data.

The aforementioned conventional reserved watch method is implemented based on a broadcast signal transmitted by a broadcasting station. A user should wait for a program in front of a display device on a time of broadcasting the corresponding program. Since the reserved recording is performed in a manner that a display device stores data recorded on a time of broadcasting the corresponding program in a memory, it is necessary to have a memory space to store the data. The recorded data may cause a copyright problem and the like. Hence, compared to the conventional reserved watch method, a user can easily and simply receive a rerun notification service of a preferred broadcast program and memory efficiency of a display device can be enhanced by designing the display device as depicted in FIG. 6 and FIG. 7.

FIG. 8 is a diagram for a data base included in a memory of a display device according to one embodiment of the present disclosure. As depicted in FIG. 8, a memory of the display device according to one embodiment of the present disclosure includes a data base and the data base stores information on a predetermined VOD server accessed by the controller of the display device. The predetermined VOD server includes a VOD server configured by default and a VOD server corresponding to a URL address inputted by a user in advance. If a signal for configuring a priority of the predetermined VOD server is received, the controller receives additional information on a newly uploaded VOD program or searches for the program in a manner of accessing the VOD server based on the configured priority.

The VOD server indicates a server providing a web page (HTML file). A VOD server program capable of providing a web page using HTTP is installed in the VOD server and the VOD server has a domain name. For instance, if a user inputs a URL 'http://www.interhdtv.kr' in a web browser, a web page is requested to a server including a domain name 'www.interhdtv.kr' and the server finds out a 'index.html' file and sends it to the browser. And, the VOD server, which is accessed by the display device according to one embodiment of the present disclosure to search for whether additional information on a newly uploaded VOD program is received or whether a program is uploaded to the VOD server, includes a VOD server configured by default and a VOD server corresponding to a URL address inputted by a user in advance.

The VOD server configured by default means a broadcasting station server providing a program registered for a rerun notification service and a content provider server providing a program registered for a rerun notification service. The VOD servers 810/820/830 corresponding to the URL addresses inputted by a user in advance means the VOD servers additionally inputted to the display device among various servers currently providing the rerun notification service in order to be used by the user.

And, the user can configure a priority of a predetermined VOD server included in the data base. If the user receives a signal for configuring a priority of the predetermined VOD server, the controller of the display device receives a VOD program guide information from the predetermined VOD server at predetermined periods or searches for a program registered by the user for a rerun notification service based on the configured priority.

For instance, as depicted in FIG. 8, if the user configures 'www.interhdtv.kr' as a first VOD server 810, 'www.dailymotion.com/kr' as a second VOD server 820, and 'www-.playy.co.kr' as a third VOD server 830, the controller receives additional information on a newly uploaded VOD program in a manner of preferentially accessing the first VOD server 810 at predetermined periods and judges whether a program for the rerun notification service is uploaded in a VOD program guide. If the program for the rerun notification service is not checked in the first VOD server 810, the controller judges whether the program for the rerun notification service is uploaded in the VOD program guide in a manner of accessing the second VOD server 820 as a next order. If the program for the rerun notification service is not checked in the second VOD server 820, the controller judges whether the program for the rerun notification service is uploaded in the VOD program guide in a manner of accessing the third VOD server 830.

Moreover, the controller may not access the VOD server due to a traffic problem. In this case, the controller of the display device receives additional information on a newly uploaded VOD program in a manner of accessing the VOD server configured by a next order and judges whether the program for the rerun notification service is uploaded in the VOD program guide. For instance, if an access is not performed for a prescribed time due to an unstable server of the second VOD server 820, the controller can receive the VOD program guide in a manner of accessing the third VOD server 830 as a next order although it is an order of receiving the VOD program guide in a manner of accessing the second VOD server 820. By designing the display device as described in FIG. 8, a user can receive a rerun notification service from a VOD server which is experientially easy-to-use and can configure a VOD server intended to be preferentially used.

Figure 9:
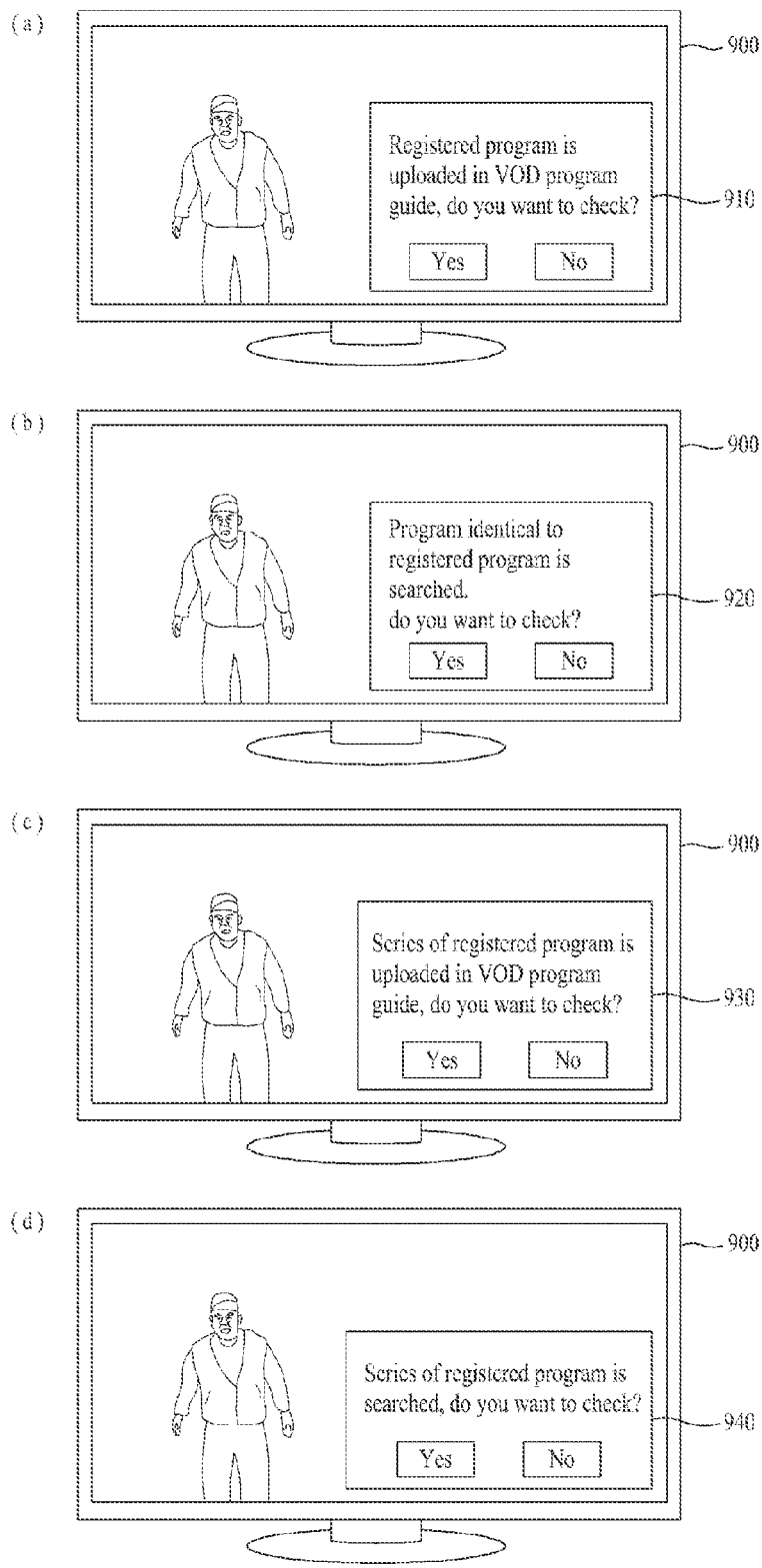
FIG. 9 is a diagram for an example that a display device according to one embodiment of the present disclosure outputs a message, which notifies an upload of a program registered for a rerun notification service, in a screen.

FIG. 9 is a diagram for an example that a display device according to one embodiment of the present disclosure outputs a message, which notifies an upload of a program registered for a rerun notification service, in a screen. As depicted in FIG. 9, the controller of the display device according to one embodiment of the present disclosure generates a VOD program guide by receiving additional information on a newly uploaded VOD program from a VOD server via the network interface and detects whether the additional information on the registered program exists in the VOD program guide.

If the additional information on the registered program exists in the VOD program guide, the controller can control a message, which indicates that the program is uploaded in the VOD program guide, to be output via the rerun notification service. And, the controller searches for the program using the additional information on the program in a manner of accessing a predetermined VOD server with a predetermined period.

If the program is searched, the controller can control a rerun notification service, which indicates that the program is searched (e.g., search results), to be provided. And, the controller can control a first message 910 indicating that a program registered for the rerun notification service by a user is uploaded in the VOD program guide and a second message 920 indicating that series of the program registered by a user is searched to be output in a screen. If the program registered by a user for the rerun notification service corresponds to a series, the controller can control a third message 930 indicating that the series is uploaded in the VOD program guide and a fourth message 940 indicating that the series of the program registered by a user is searched to be output in the screen.

FIG. 10 is a diagram for an example that a display device according to one embodiment of the present disclosure stores a search result in a cloud server. As depicted in FIG. 10 (a), if it is checked that a program registered for a rerun notification service is uploaded in the VOD program guide or searching is terminated since the program has been found in the VOD server, the controller of the display device 1000 according to one embodiment of the present disclosure can control a search result to be simultaneously stored in a memory 1010 and a cloud server 1020. And, a user can configure the search result to be stored either the memory 1010 or the cloud server 1020. The memory 1010 and the cloud server 1020 are an example of a storing space to store data and can be applied to all storing spaces capable of storing data such as an external hard drive and the like.

As depicted in FIG. 10 (*b*), if the search result is stored in the memory 1010 and the cloud server 1020 at the same time, the controller of the display device 1000 according to one embodiment of the present disclosure can control a list of the stored search result to be output in a screen for a predetermined time according to a request of a user. The predetermined time is set to 30 days by default and can be modified by a user. If a signal for selecting a specific search result in the list of the search result is received, the controller of the display device 1000 according to one embodiment of the present disclosure accesses the memory 1010 or the cloud server 1020 and may be then able to control search information included in the specific search result to be output in the screen of the display device 1000. By using the cloud server, efficiency of a memory storing space is enhanced and a user can easily and simply check a history on a previously searched program.

FIG. 11 is a diagram for an example that a display device according to one embodiment of the present disclosure outputs a rerun notification service. The controller of the display device 1100 according to one embodiment of the present disclosure may register a program for a rerun notification service 1110, generate a VOD program guide by receiving an additional information on a newly uploaded VOD program from a VOD server via the network interface, and detect whether the additional information on the registered program exists in the VOD program guide. If the additional information on the registered program exists in the VOD program guide, the controller can control a message, which indicates that the program is uploaded in the VOD program guide, to be output via the rerun notification service 1110.

When a program for the rerun notification service is registered, the controller of the display device 1100 according to one embodiment of the present disclosure can control information on a charged billing program and a free billing program to be selectively inputted. If the charged billing program is selected, the controller can control the rerun notification service to be output in a manner of including charged billing information in the rerun notification service. Moreover, if the rerun notification service 1110 including the charged billing information is output, the controller can control a schedule 1113 that the rerun service for the charged billing program is converted to free to be output together. The rerun notification service 1110 can include information 1111 on start time/end time of the program, billing information 1112 of the rerun service for the program, and an icon 1114 making a request for a playback of the program.

And, as depicted in FIG. 11 (*b*), the controller of the display device 1100 according to one embodiment of the present disclosure searches for whether the program is uploaded in the VOD program guide using additional information on the detected program in a manner of accessing a predetermined VOD server at predetermined time periods. If the program is searched in the predetermined VOD server, the controller controls a rerun notification service 1120 making a request for an output of the program to be output in the screen. The rerun notification service 1120 can include a URL address 1122 of the VOD server in which the program is searched, information 1121 on start time/end time of the program, an icon 1123 making a request for an output of the program.

Although it is not depicted in FIG. 11, as mentioned in the foregoing description, the rerun notification service 1110/1120 can include viewing history information on the program. As mentioned earlier in FIG. 7, the controller outputs a program or other contents in a first region of the display device 1100 and can output the rerun notification service 1110/1120 in a second region included in the first region of the display device 1100. By designing the display device according to the aforementioned description, a user can make a prompt request for the information on the program and output of the program via the rerun notification service, thereby enhancing convenience of the user.

Figure 12:
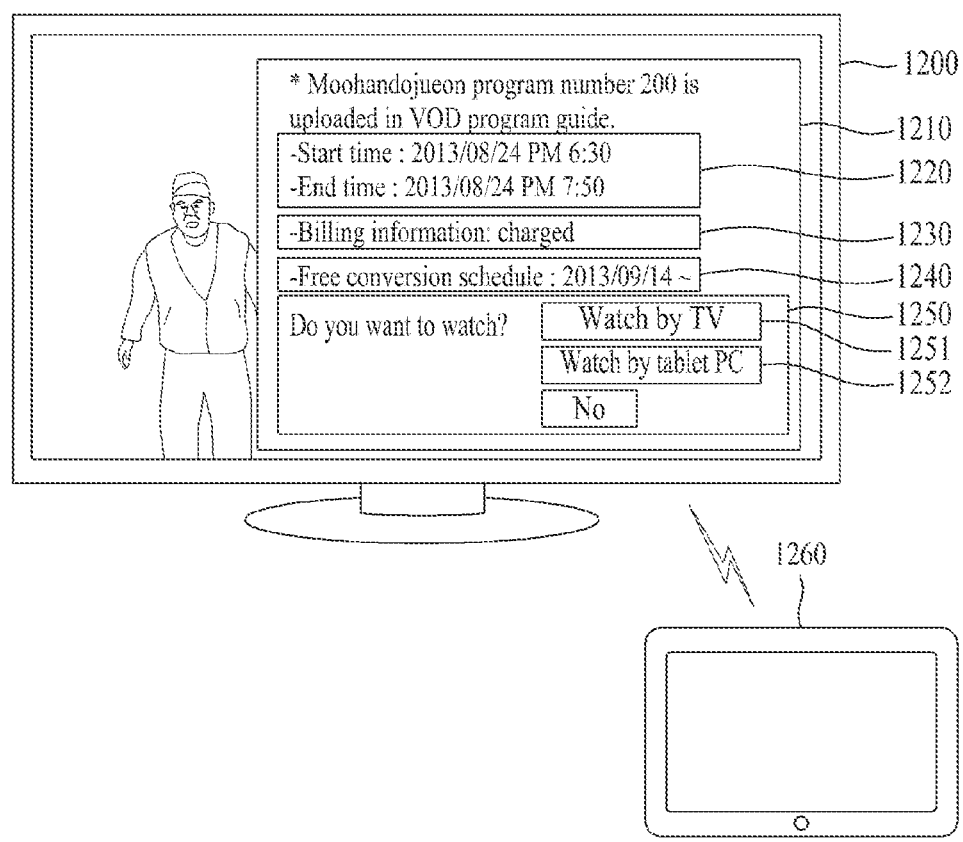
FIG. 12 is a diagram for an example that a display device according to one embodiment of the present disclosure provides a rerun notification service via an external display device paired with the display device.

FIG. 12 is a diagram for an example that a display device according to one embodiment of the present disclosure provides a rerun notification service via an external display device paired with the display device. As depicted in FIG. 12, if a signal for making a request for a playback of the program is received via the output rerun notification service 1210, the controller of the display device 1200 according to one embodiment of the present disclosure can control the program to be played in a manner of accessing the program in the VOD server via the network interface. And, the controller can control the program to be played in a manner that an external display device 1260 paired with the display device 1200 accesses the program in the VOD server according to a request of a user.

The rerun notification service 1210 generated by the display device 1200 according to one embodiment of the present disclosure can include information 1220 on start time/end time of the program, accounting information 1230 of the rerun notification service for the program, a schedule 1240 that the rerun notification service for a charged billing program is converted to free, and an icon 1250 making a request for an output of the program. The icon 1250 can include an icon 1251 making a request for an output of the program in the display device 1200 and an icon 1252 making a request for the output of the program in an external display device 1260 paired with the display device 1200.

Moreover, if the display device 1200 is paired with the external display device 1260, the rerun notification service 1210 can be configured to be directly output in the external display device 1260. By designing the display device according to the aforementioned description, a user can receive a rerun notification of a program registered for the VOD service by such a portable device as a smartphone, a tablet PC, and the like.

Figure 13:
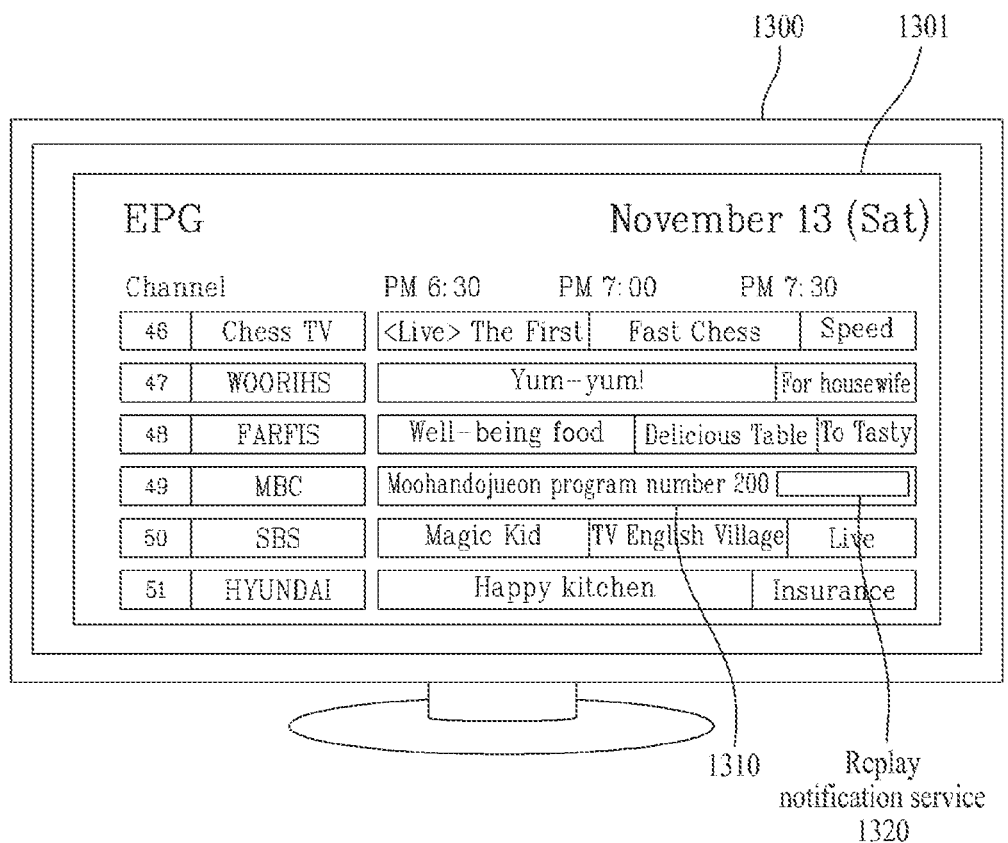
FIG. 13 is a diagram for an example that a display device according to one embodiment of the present disclosure outputs an EPG.

FIG. 13 is a diagram for an example that a display device according to one embodiment of the present disclosure outputs an EPG. As depicted in FIG. 13, if a user registers a program 1310 to receive a rerun notification service, the controller of the display device 1300 according to one embodiment of the present disclosure can display an indicator 1320 indicating that the program for the rerun notification service is registered in the VOD program guide.

The indicator 1320 can be displayed in a cell of the registered program 1310 together with program title information in the EPG 1301. The indicator can perform a function of informing a user of the registered program 1310 currently capable of receiving the rerun notification service in a manner of changing a color of a title of the registered program 1310 or highlighting a border of the cell of the registered program 1310 to distinguish the registered program from different programs. By designing the display device according to the aforementioned description, a user can promptly identifies a searching progress situation, which is related to the rerun notification service of the program registered for the rerun notification service, on the EPG 1301.

Figure 14:
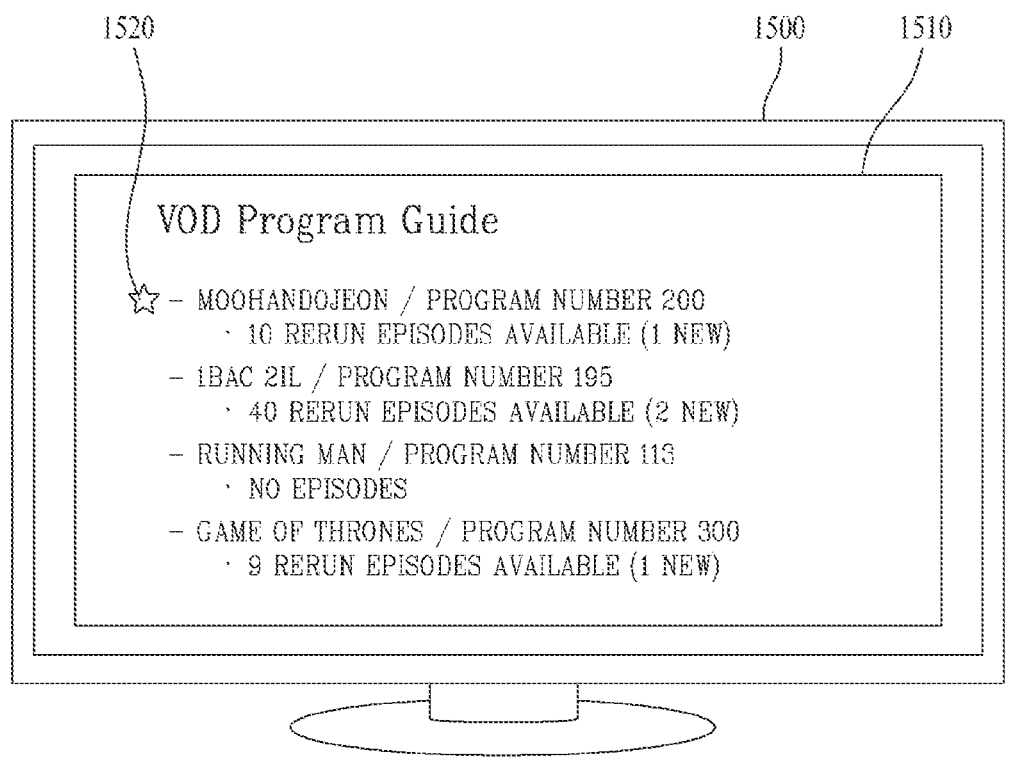
FIG. 14 is a diagram for an example that a display device according to one embodiment of the present disclosure outputs a VOD program guide.

FIG. 14 is a diagram for an example of a VOD program guide displayed on a display device. The VOD program guide as described herein may be a data set that includes data related to VOD programming received from one or more VOD content providers. The data set may be searched by the controller of the display device 1500 for availability of new programs added to the VOD servers and registered in the rerun notification service, as previously described. The VOD program guide may be generated using additional information on a plurality of VOD programs received from the VOD server. Moreover, the VOD program guide may be generated in the form of a graphical user interface (GUI) as illustrated in FIG. 14.

For example, a VOD program guide 1510 may be displayed on a display device 1500. The display device 1500 may correspond to display devices of previously described embodiments. The VOD program 1510 may show a plurality of programs which are available for on-demand viewing. The listing of programs may include a number of content (e.g., episodes) available for each program as well as a number of newly added (e.g., unviewed) episodes. An indicia 1520 may be displayed to indicate that a particular program has been registered for the rerun notification service. Accordingly, when a particular program is registered with the rerun notification service, VOD programming available on various VOD servers may be searched to identify when a rerun episode for the registered program has been added to the VOD servers. As the user is notified of availability of reruns on remote VOD servers, the need to record shows for later viewing or scheduling the display device to tune to a particular show at set times may not be necessary. It should be appreciated that the VOD program guide 1510 described with reference to FIG. 14 is exemplary, and may include other appropriate type of information or the GUI may be formatted in various ways. For example, the VOD program guide may be a GUI available through various VOD content providers configured for the rerun notification service of the present disclosure, such as Netflix, Vudu, interhdtv, or the like.

Figure 15:
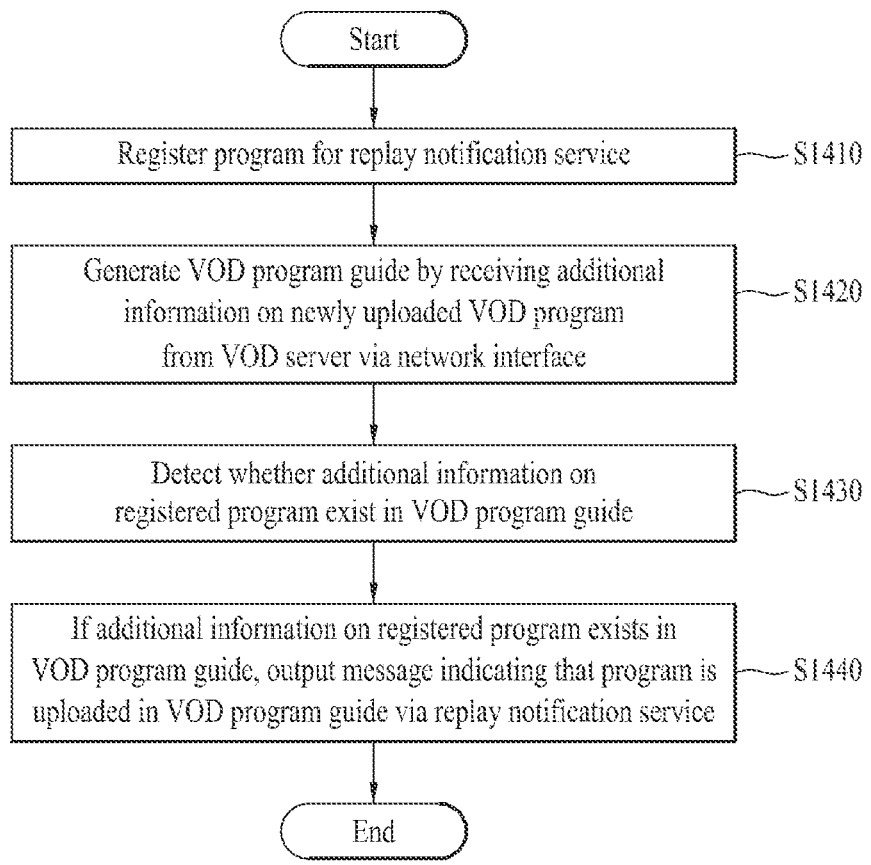
FIG. 15 is a flowchart for a method of controlling a display device according to one embodiment of the present disclosure.

FIG. 15 is a flowchart for a method of controlling a display device according to one embodiment of the present disclosure. FIG. 15 can be complementally comprehended by those having ordinary skill in the art with reference to FIG. 1 to FIG. 14. The display device according to one embodiment of the present disclosure may register a program for a rerun notification service [S1410], generate a VOD program guide in a manner of receiving additional information on a newly uploaded VOD program from a VOD server via a network interface [S1420], and detect whether the additional information on the registered program exists in the VOD program guide [S1430]. The VOD program guide may be a database of information on available programming or a graphical user interface (GUI) which may be displayed on the display device. If the additional information on the registered program exists in the VOD program guide, the controller outputs a message, which indicates that the program is uploaded in the VOD program guide, via the rerun notification service [S1440]. Since detail explanation on each of the steps is described in the foregoing description, repeated explanation is omitted.

For clarity of explanation, each diagram is explained in a manner of being divided. Yet, it is possible to design a new embodiment to implement the new embodiment by combining the embodiments, which are described in each of the diagrams. And, a display device and a method of controlling therefor according to one embodiment may not limitedly apply to the composition and method of the aforementioned embodiments. The aforementioned embodiments may be configured in a manner of being selectively combined the whole of the embodiments or a part of the embodiments to achieve various modifications.

While the present disclosure has been described and illustrated herein with reference to the preferred embodiments and diagrams thereof, the present disclosure may be non-limited to the aforementioned embodiments and it will be apparent to those skilled in the art that various modifications and variations can be made therein without departing from the spirit and scope of the present disclosure. Thus, it is intended that the present disclosure covers the modifications and variations of this disclosure that come within the scope of the appended claims and their equivalents.

And, both an apparatus disclosure and a method disclosure are explained in the present specification and the explanation on the both of the disclosures can be complementally applied, if necessary.

What is claimed is:

1. A method of providing a Video On Demand (VOD) service in a display device executed by a controller, the method comprising:
    registering a program to receive notifications when a rerun of the program is available on a VOD server;
    receiving information on a plurality of VOD programs and additional information on a newly uploaded VOD program from the VOD server via a network interface;
    generating a VOD program guide using at least one of the received information on the plurality of VOD programs and the additional information on the newly uploaded VOD program;
    detecting whether the received information includes information on the registered program;
    displaying a first message indicating that the rerun of the program has been uploaded in the VOD server when the information on the registered program exists in the received information;
    accessing the VOD server at a predetermined time period;
    searching for the program in the VOD server using the additional information on the program; and
    displaying a second message indicating that the rerun of the program has been searched in the VOD server when the program is searched,
    wherein the rerun program notifications are provided for registered programs in which broadcast programs previously had broadcasted in real time are available on the VOD server, and
    wherein, when there exists a plurality of programs matching the information corresponding to the registered program in the VOD program guide, selecting programs which have not been previously watched and displaying a message for rerun program notifications only for the selected unwatched programs.

2. The method of claim 1, wherein the notification of available reruns includes information on a start time/end time of the program, billing information for accessing the program, and an icon for requesting playback of the program.

3. The method of claim 2, further including playing the program by accessing the program in the VOD server via the network interface in response to a selection of the icon requesting playback of the program on the output message.

4. The method of claim 1, wherein the received information is received according to at least one of a prescribed time period, when a VOD program guide is accessed, or when the display device is turned on or turned off.

5. The method of claim 1, wherein the notification is provided as a popup window on a display screen of the display device when the rerun of the program is uploaded in the VOD server.

6. The method of claim 1, wherein the registering the program to receive notifications includes registering information on a plurality of broadcasts of the program together when the registered program corresponds to a series.

7. The method of claim 1, further including displaying an indicator in at least one of a VOD program guide or an electronic programming guide (EPG) that identifies the program as a program registered to receive notifications.

8. The method of claim 1, the registering the program to receive notifications includes selectively receiving information on programs based on a fee associated with the program.

9. The method of claim 8, wherein the message for the rerun program includes a schedule for when the fee for the program is converted to be free.

10. A display device, comprising:
a memory;
a display module;
a network interface configured to access a Video On Demand (VOD) server; and
a controller configured to control the display device,
wherein the controller is configured to register a program to receive notifications when the program is updated on the VOD server, to receive information on a plurality of VOD programs and additional information on a newly uploaded VOD program from the VOD server via the network interface, to generate a VOD program guide using at least one of the received information on the plurality of VOD programs and the additional information on the newly uploaded VOD program, to detect whether the received information includes information corresponding to the registered program, and to display a notification when the registered program is updated on the VOD server, the notification indicating that a rerun of the program which has been previously broadcasted in real time has been added to the VOD server,
wherein, when there exist a plurality of programs matching the information corresponding to the registered program in the VOD program guide, the controller is configured to select programs which have not been previously watched, and to display a message for the rerun program notification only for the selected unwatched programs,
wherein the controller is configured to access the VOD server at a predetermined time period, to search for the program in the VOD server using the additional information on the program and to display a message indicating that the rerun of the program has been searched in the VOD server when the program is searched.

11. The display device of claim 10, wherein the notification includes information on a start time/end time of the program, billing information for accessing the program, and an icon for requesting playback of the program.

12. The display device of claim 11, wherein the controller is configured to play the program by accessing the program in the VOD server via the network interface when a signal requesting playback of the program is received via the displayed notification.

13. The display device of claim 10, wherein the received information is received according to at least one of a prescribed time period, when the VOD program guide is accessed, or when the display device is turned on or turned off.

14. The display device of claim 10, wherein the notification is provided as a popup window on a display screen of the display module when the rerun of the program is uploaded in the VOD server.

15. The display device of claim 10, wherein the controller is configured to register information on a plurality of broadcasts of the program together when the registered program corresponds to a series.

16. The display device of claim 10, wherein the controller is configured to display an indicator in at least one of a VOD program guide or an electronic programming guide (EPG) that identifies the program as a program registered to receive notifications.

17. The display device of claim 10, wherein the controller is configured to selectively display information on programs based on a fee associated with the program.

18. The display device of claim 17, wherein the notification includes a schedule for when the fee for the program is converted to be free.

* * * * *